United States Patent
Belka et al.

[11] Patent Number: 6,128,814
[45] Date of Patent: *Oct. 10, 2000

[54] METHOD OF PRESS FITTING WORKPIECES

[75] Inventors: Zbigniew J. Belka, Warren; William M. Faitel, Oxford, both of Mich.

[73] Assignee: Unova IP Corp., Beverly Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,911

[22] Filed: Apr. 8, 1996

Related U.S. Application Data

[62] Division of application No. 08/379,910, Jan. 30, 1995, Pat. No. 5,537,734.

[51] Int. Cl.[7] .......................... B23Q 17/00; G01M 19/00
[52] U.S. Cl. .................................... 29/407.08; 29/407.05; 29/407.09; 29/466; 29/525
[58] Field of Search .......................... 29/407.08, 407.04, 29/407.05, 407.09, 464, 466, 520, 703, 714, 894.341–894.343, 407.01, 407.1, 525, 718, 705, 709

[56] References Cited

U.S. PATENT DOCUMENTS

| | | | |
|---|---|---|---|
| 3,050,837 | 8/1962 | Reed et al. | 29/718 |
| 3,713,198 | 1/1973 | Tobak et al. | 29/718 |
| 3,800,600 | 4/1974 | Chapin | 29/894.342 |
| 3,893,217 | 7/1975 | Edmond | 29/407.08 |
| 3,916,499 | 11/1975 | Frame et al. | 29/718 |
| 4,581,816 | 4/1986 | Klufas et al. | 29/705 |
| 4,621,491 | 11/1986 | Moriki et al. | 29/718 X |
| 4,625,416 | 12/1986 | Ohtaki et al. | 33/180 |
| 4,794,690 | 1/1989 | Yamanaga et al. | 29/709 |
| 4,945,631 | 8/1990 | Banner et al. | 29/705 |
| 5,138,757 | 8/1992 | Ball et al. | 29/407.05 |
| 5,154,046 | 10/1992 | Piccolo et al. | 29/718 X |
| 5,159,754 | 11/1992 | Vancsik | 29/525 X |
| 5,315,752 | 5/1994 | Ohta et al. | 29/525 X |
| 5,511,300 | 4/1996 | Merz et al. | 29/407.08 |

FOREIGN PATENT DOCUMENTS

| | | | |
|---|---|---|---|
| 4121105 | 1/1992 | Germany | 29/525 |
| 4318157 A1 | 12/1994 | Germany | 29/525 |

*Primary Examiner*—David P. Bryant
*Assistant Examiner*—Marc W. Butler
*Attorney, Agent, or Firm*—Reising, Ethington, Barnes, Kisselle, Learman & McCulloch, P.C.

[57] ABSTRACT

A press for press-fitting an axle tube into a differential housing having a locator and accurately locating a flange on the tube relative the locator by offsetting flange mislocation, deflection of the tube and press and deflection and/or shifting of the tube and housing fixtures during press-fitting. The press has a ram in operable communication with a drive and a computer in communication with the ram and drive to accurately control movement of the ram and depth of insertion of each tube. Carried by the ram is a probe that senses flange location relative on the tube for determining deviation in flange location and offsetting depth of insertion to compensate for any such deviation. Another sensor communicates to the computer the insertion force the ram is applying to the tube to determine tube and press deflection. Where a pair of tubes are inserted at the same time, the computer compares insertion force of both tubes to determine if there is any force imbalance causing deflection and/or shifting of the workpiece fixtures. During insertion, and preferably as the tube is nearing full depth of insertion, the computer communicates with each force sensor and preferably at least one lookup table to select an offset for each tube corresponding to press and tube deflection and another offset corresponding to force imbalance. Thereafter, the computer applies the offsets to the insertion depth of each tube to accurately locate each flange relative to the housing locator when assembly is completed.

16 Claims, 6 Drawing Sheets

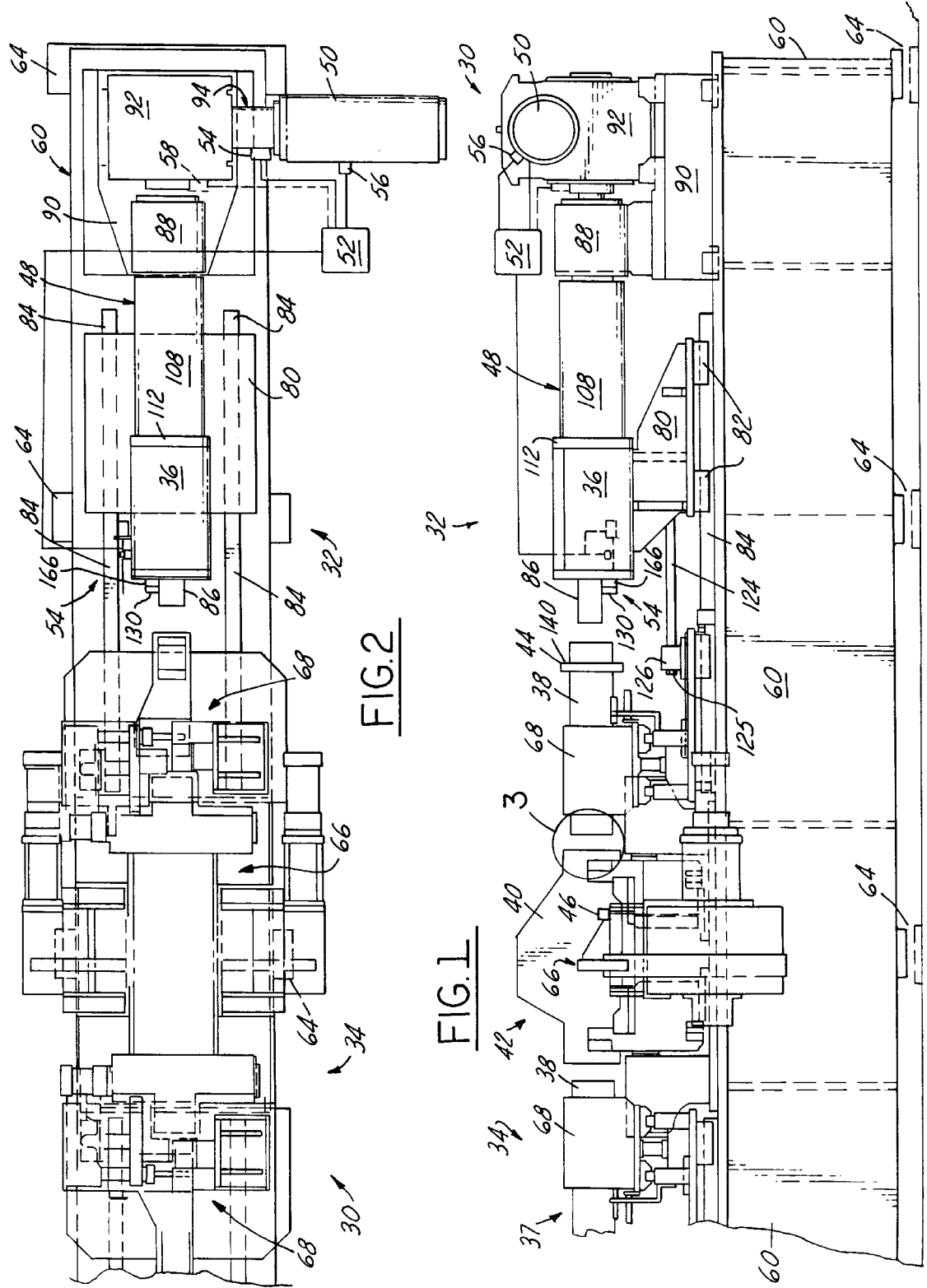

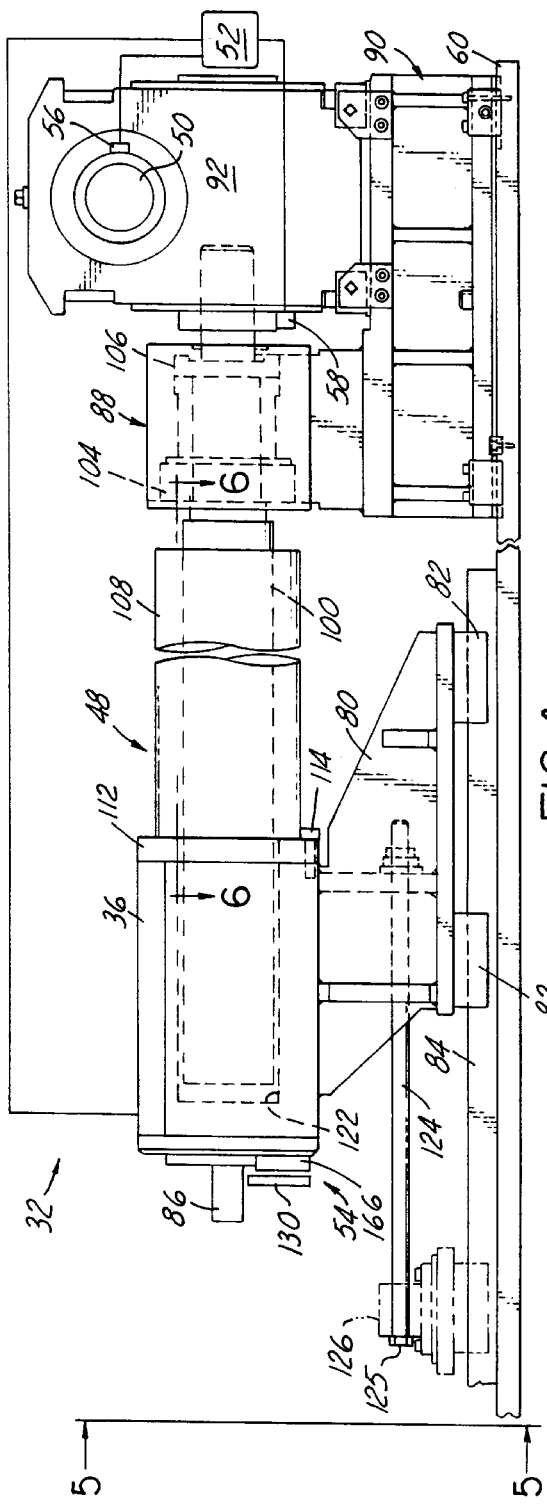
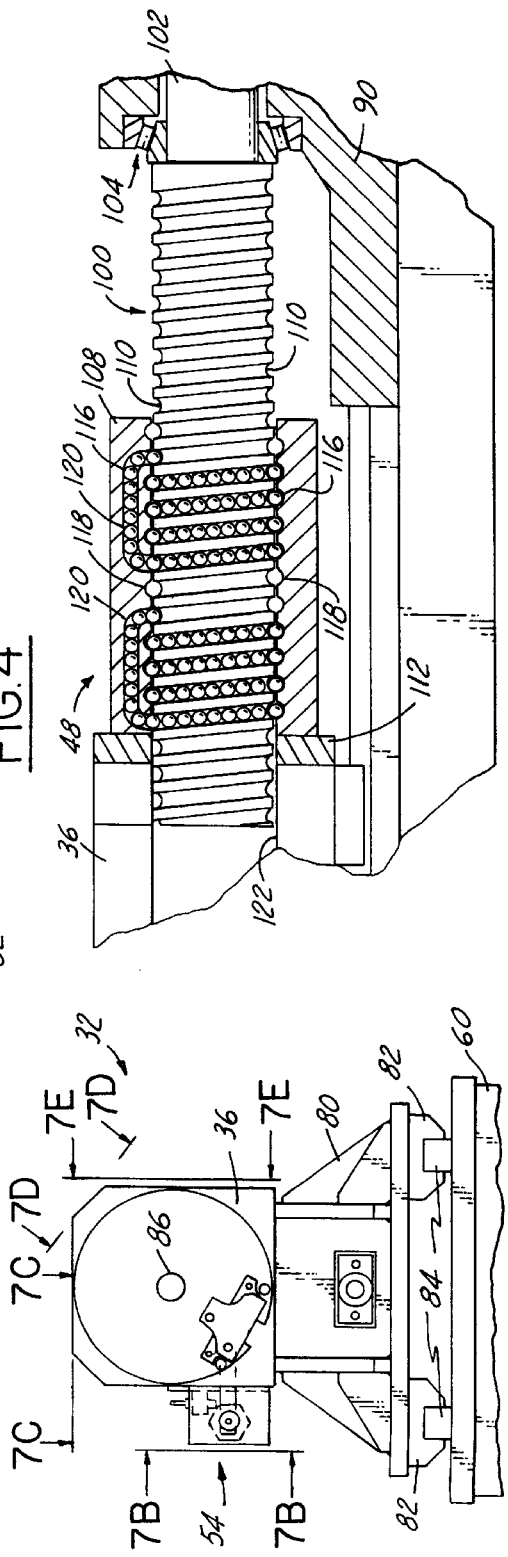
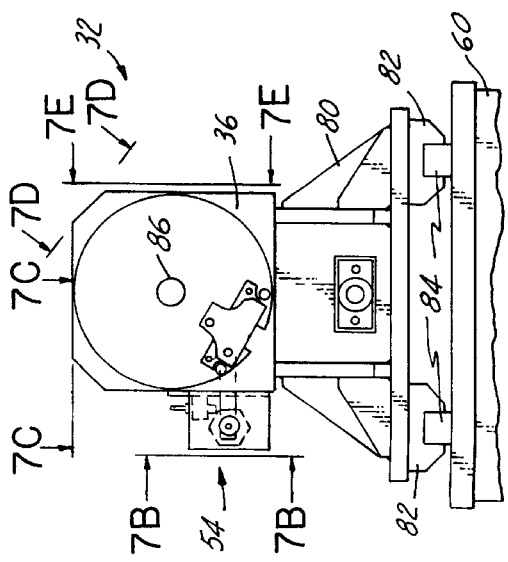

METHOD OF PRESS FITTING WORKPIECES

REFERENCE TO A RELATED APPLICATION

This is a division of U.S. application Ser. No. 08/379,910 filed on Jan. 30, 1995 and issued on Jul. 23, 1996 as U.S. Pat. No. 5,537,734.

FIELD OF THE INVENTION

This invention relates to a press for assembling parts with an interference fit and more particularly to a press that adjusts the depth of insertion of the parts to compensate for part mislocation and press deflection due to the force applied during assembly to maintain close tolerances of the assembled location of the parts.

BACKGROUND

Conventional hydraulic presses have been used to insert hollow axle tubes into differential housings in constructing rear floating axle assemblies for trucks and other heavy-duty commercial vehicles. These axle tubes have a flange for mounting a stationary housing of the wheel hub assembly thereto which must be accurately located with respect to the differential housing. During vehicle operation, an axle half-shaft received in the axle tube transmits torque from the engine to the vehicle wheel turning the wheel and thereby moving the vehicle.

If each mounting flange is not properly located relative to the differential housing when assembly is completed, the axle assembly may be rejected, significantly increasing manufacturing costs. Even worse, if an axle tube with an improperly located mounting flange is put in service on a vehicle, it can result in expensive warranty repairs to replace excessively worn or failed components, particularly since these vehicles are quite expensive and can carry lengthy warranties of 50,000 miles or more.

Should a floating axle assembly with an improperly located flange be assembled to a vehicle, the flange mislocation can cause vehicle wheel misalignment, negatively affecting vehicle ride and tire wear while undesirably increasing vehicle maintenance. Vehicle wheel misalignment can also cause undesirable loading on the axle and wheel hub assembly possibly leading to premature failure and possible warranty repairs that are undesirable since the vehicle manufacturer typically has to pay for the repairs.

If the mounting flange is located too far away from the differential housing, the brake assembly of the wheel may rub against the stationary housing of the wheel hub assembly mounted to the axle tube mounting flange causing undue premature wear of the brake assembly or fire during vehicle operation. If the flange is located too close to the differential housing, it can produce too large of a gap between the brake assembly and the stationary wheel housing leading to excess contamination inside the brake assembly.

During assembly of these axle assemblies, the hydraulic press forces one end of the axle tube into a complementary opening in the differential housing. So that the axle is firmly and permanently pressed into the housing, the axle tube opening in the housing is sufficiently smaller than the outer diameter of the axle tube to provide a tight interference fit when the tube is inserted. Unfortunately, inserting each axle tube into the differential housing to the proper depth to achieve accurate location of its mounting flange relative to the differential housing can present considerable difficulty, particularly using conventional methods and press equipment.

Two problems typically exist that can lead to the mounting flange being mislocated with respect to the differential housing. The first problem is that the position of the flange on the axle tube can and does vary from part to part. Therefore, unless the depth of insertion of the tube into the housing is precisely controlled to accommodate any variation in the position of the mounting flange on the tube, the flange will also be mislocated with respect to the differential housing when assembly is completed. Unfortunately, since the force required to insert the tube into the differential housing is so great, this mislocation cannot be prevented by simply engaging the flange with the press and inserting the tube into the housing until the flange is properly located relative to the housing because the press would damage or destroy the flange. However, in typical practice, these conventional presses simply ignore the mounting flange mislocation on the tube and insert each axle tube into the differential housing a pre-determined fixed distance, usually approximately 3 to 4 inches, resulting in the flange also being mislocated relative to the housing.

The second problem is that, during assembly, the force needed to insert the axle tube into the opening in the differential housing causes the tube, the differential housing, the axle tube and housing locating and clamping fixtures as well as the press to deflect, further compounding the difficulty in accurately locating the mounting flange relative to the housing. As the tube is forced into the opening during assembly it is compressed, reducing slightly its length making accurate positioning of the flange that much more difficult. When released after assembly, the tube is no longer being compressed by the press and "springs back" to substantially its original length causing the flange to move away from the differential housing during spring-back by a distance approximately equal to how much the tube was compressed during insertion. Also, while the tube is being inserted, the force of insertion causes the press to deflect making it even more difficult to accurately position the mounting flange.

In the instance where a pair of tubes is inserted into a differential housing substantially simultaneously, deflection and/or shifting of the axle tube and differential housing fixtures can also occur if the force required to insert each tube into the differential housing is not substantially the same for both tubes. If deflection and/or shifting is not offset, it can result in a further source of mounting flange mislocation.

Additionally, the amount of deflection increases as the force needed to insert the tube into the housing increases. Furthermore, since the amount of force needed to insert the tube varies from tube to tube and housing to housing, it becomes a very complicated matter, indeed, to insert the tube the proper distance into the differential housing tube opening such that the mounting flange is accurately located with respect to the differential housing.

Therefore, unless these deflections are taken into account, mislocation of the flange during assembly can also occur. Moreover, if two or more such errors in locating the flange occur, the errors can aggregate to increase the total amount of mislocation of the flange thereby raising the likelihood that the axle assembly will have to be scrapped. Unfortunately, conventional hydraulic presses do not adequately compensate for these mounting flange positioning difficulties making them increasingly less well suited to manufacture axles requiring ever greater precision of assembly and increasingly more accurate location of its mounting flanges.

SUMMARY OF THE INVENTION

A press for press-fitting axle tubes into a differential housing and controlling the depth of insertion to accurately locate a mounting flange on each tube by varying and controlling the depth of insertion to account for mislocation of the flange on the tube and deflection of the tube and press during insertion. The press has a ram coupled to an electric motor drive by a ballscrew for precisely controlling the movement of the ram to accurately control the depth that the axle tube is inserted into the differential housing. To accurately control movement of the ram and, thus, the depth of insertion of the tube, a ram position sensor, that preferably is a shaft encoder on the drive output shaft or ballscrew shaft, communicates to a computer the precise position of the ram.

To measure any variation in position of the mounting flange on the axle tube, the ram has a probe which extends from the ram to engage the mounting flange so that the distance from the end of the tube engaged by the ram to the flange can be accurately determined. The computer determines any deviation in the location of the mounting flange by preferably subtracting from a constant, representing the intended distance that the flange should be from the end of the tube, the actual distance of the flange from the tube end. Any deviation in flange position is used by the computer to determine an offset to add or subtract to a pre-determined depth of axle tube insertion for use in calculating a new insertion depth. Preferably, the offset is equal to the deviation in location of the flange on the axle tube to ensure accurate positioning of the mounting flange with respect to the differential housing.

Preferably, the probe has a locator button on a plate attached to one end of a reciprocable cylinder rod and has its locator button accurately located relative to the ram. To accurately measure the distance from the end of the axle tube to an outboard axial face of the mounting flange, the press ram is brought to bear against the end of the tube and the locator button is extended from the ram until it engages the flange. Preferably, a magnet moves in unison with the locator button and travels along a rod for being sensed by a proximity sensor fixed to the ram to accurately measure the distance traveled by the magnet and, hence, determine the flange location on the tube.

To offset the depth of insertion to account for deflection of the axle tube and press during insertion and preferably as the axle tube is approaching the calculated depth of insertion, the computer communicates with a force sensor to determine the force being applied by the ram while inserting the tube into the differential housing. Preferably, the force sensor is a sensor that monitors drive motor torque by measuring the amount of electric current used by the drive motor as the tube is being inserted into the differential housing. Preferably, the computer determines the predicted deflection of the axle tube and the press by determining the force the ram is applying to the tube during insertion and selecting from a lookup table, or calculating, a deflection value corresponding to the applied force. Preferably, the force is determined by the computer when the ram has inserted the tube into the housing to almost the calculated depth of insertion (including the offset for any mislocation of the flange on the tube) so that tube "spring back" and press deflection can be accurately offset.

To compensate for this deflection to accurately position the mounting flange with respect to a locator (usually a hole) in the differential housing, the amount of the predicted deflection is added to the calculated depth of insertion and the tube is inserted further into the housing by the amount of the predicted deflection. Thereafter, when the ram is retracted and the compressed axle tube "springs back" to substantially its previous length, the mounting flange is accurately located with respect to the locator in the differential housing.

Preferably, the lookup table has a series of applied forces associated with drive motor torque and predicted deflections associated with each applied force value. Preferably, the predicted deflection values are determined empirically through routine testing and experimentation. Preferably, the determination of the offsets to ensure accurate positioning of the mounting flange is done using computer software run by a computer, such as a computer using computer numerical control (CNC) or a programmable controller.

Alternatively, for empirically determined force-deflection data, regression, such as linear or polynomial regression, or another like method, may be used to determine an equation representative of the relationship between the applied force and the press and axle tube deflection. This equation can be used by the computer for calculating deflection after the applied force has been determined during press operation. If desired, since applied force is a function of drive motor torque and drive motor torque is a function of drive motor electrical current, the empirical data may consist of drive motor current-deflection data and regression may be used by the computer to determine an equation for predicting deflection for a given drive motor current during press operation.

Where a pair of axle tubes is inserted into a differential housing substantially simultaneously, the force required to insert each tube into the housing is compared and, if the forces of insertion are unequal, an offset is preferably determined to compensate for any such insertion force imbalance. This enables each tube to be accurately inserted into the differential housing, if there is an insertion force imbalance, by appropriately compensating for any deflection and/or shifting of the tooling and/or fixtures holding and supporting the axle tubes as well as the differential housing during insertion attributable to insertion force imbalance.

Preferably, an offset to compensate force imbalance related deflection and/or shifting is determined by the computer by communicating with the force sensor of both presses and comparing the force of insertion of each tube during insertion. Using the insertion force comparison, the computer determines an offset to apply to the depth of insertion due to any force imbalance by selecting from a lookup table, or calculating, an offset value corresponding to the force imbalance. Preferably, the force imbalance is determined by the computer when each press ram has inserted its axle tube into the differential housing to almost the calculated depth of insertion so that each mounting flange will be accurately located upon assembly in spite of any insertion force imbalance.

Preferably, all of this is done "on the fly" during press operation to maximize the rate of production of finished axle assemblies. With the axle tube and differential housing properly located and fixtured, the press ram moves toward the axle tube until it engages the tube end. After the ram has engaged the tube end, the probe button is extended to measure the distance the mounting flange is from the end of the tube engaged by the ram and any deviation in position of the flange is determined and applied to the calculated depth of tube insertion as an offset. When the ram has inserted the tube into the differential housing almost to the calculated depth of insertion, the motor current is preferably sensed as an indicator of the force the ram is applying against the tube. This current or the indicated insertion force is used by the computer as an indexing variable to select the predicted press and axle tube deflection from the lookup table and this deflection is preferably applied to the calculated depth as an offset. Alternatively, this current or the indicated force is inputted into a regression formula to calculate the predicted deflection. As a result of compensating for this deflection, the tube is inserted by the press further into the housing than the calculated depth of insertion, even after applying the offset for any flange mislocation, to ensure that the mounting flange is accurately located relative to the differential housing locator.

Where both axle tubes are inserted into the differential housing at the same time, the insertion force of each tube is also compared and an offset is preferably determined to compensate for any deflection and/or shifting of the tube and differential housing fixtures that occurs during insertion due to any insertion force imbalance. Any insertion force imbalance determined is preferably also used by the computer as an indexing variable to select the predicted fixture deflection and/or shifting from a lookup table and this offset is preferably applied to the calculated depth of each tube. Alternatively, it can also be inputted into a regression formula to calculate the offset. As a result, each tube is inserted by the press into the housing to the desired depth of insertion, by also applying any offset or offsets to compensate for any insertion force imbalance, for enabling the mounting flange to be accurately positioned relative to the differential housing locator after the force of each press is removed.

Preferably, only a single lookup table may be required to offset both press deflection and fixture deflection and/or fixture shifting based upon the measured force of insertion of each tube and/or the difference in forces of insertion of the tubes resulting in any insertion force imbalance.

Objects, features and advantages of this invention are to provide a press for press-fitting an axle tube into an opening in a differential housing to produce a vehicle wheel axle assembly which precisely controls the depth of insertion of the tube into the housing to accurately locate the mounting flange relative to the housing, produces an axle assembly that is durable and of high quality and rugged construction, precisely controls the depth of insertion of the tube and offsets the depth of insertion to account for any mislocation of the mounting flange on the axle tube, precisely controls the depth of insertion of the tube and offsets the depth of insertion to account for deflection of the axle tube and press during insertion to ensure accurate location of the flange relative the housing after insertion is completed, precisely controls the depth of insertion of each tube and offsets the depth of insertion to account for deflection and/or shifting of any tooling and/or fixtures that locate and clamp the axle tubes and differential housing during insertion to ensure accurate location of the flange relative the housing after insertion is completed, precisely controls depth of insertion of each axle tube by precisely controlling travel of each press ram, utilizes a computer and at least one simple lookup table to quickly determine predicted deflection of the tube and press as well as deflection and/or shifting of the workpiece fixtures to adjust the depth of insertion of the tube into the housing preferably while the tube is being inserted into the housing, can flexibly accommodate axle tubes of different types, lengths and sizes and differential housings of different types and sizes, and, is reliable, flexible, durable and of simple and compact design and economical manufacture.

BRIEF DESCRIPTION OF THE DRAINS

These and other objects, features and advantages of this invention will be apparent from the following detailed description of the preferred embodiment, appended claims, and accompanying drawings in which:

FIG. 1 is a partial side view of an assembly station having a pair of presses embodying this invention for assembling a pair of axle tubes to a motor vehicle differential housing and illustrating in simple pictorial form a control system of the press for controlling press operation and ensuring precise assembly of the components;

FIG. 2 is a partial top plan view of the assembly station and presses of FIG. 1;

FIG. 4 is an enlarged partial side view of the press illustrating more clearly a probe for accurately locating a mounting flange on the axle tube and a motor, ball screw and nut assembly and ram for pressing the tube into engagement with the differential housing;

FIG. 5 is a front view of the press ram in the direction of line 5—5 of FIG. 4;

FIG. 6 is an enlarged partial sectional view of the press taken along line 6—6 of FIG. 4 illustrating more clearly the ball screw and nut assembly;

DETAILED DESCRIPTION OF THE INVENTION

Figure 3:
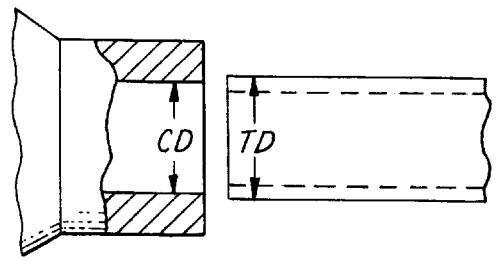
FIG. 3 is a fragmentary view on an enlarged scale of that portion of FIG. 1 of the axle tube and differential housing enclosed by the circle 3 illustrating more clearly how they will fit together when assembled.

Referring in more detail to the drawings, FIGS. 1 and 2 illustrate an assembly station 30 with a pair of presses 32 and 34 of this invention each having a ram 36 for press-fitting a hollow axle tube 38 into a vehicle differential housing 40 (not shown in FIG. 2), for producing an axle assembly 42 having minimum tolerance errors. Preferably, the pair of presses 32 and 34 substantially simultaneously insert a pair of axle tubes 38 into the differential housing 40 while precisely controlling the depth of insertion of each tube 38 for accurately locating a wheel hub mounting flange 44 on each tube relative to a locator 46 (preferably, an opening or projection) in the housing 38. Since both presses 32 and 34 are of substantially identical construction, only the rightmost press 32 is shown and its construction will be described in further detail.

To press the tube 38 into the housing 40, the ram 36 is operatively coupled to a ballscrew and nut assembly 48 that, in turn, is operatively coupled by a gear reducer 92 to a drive 50, preferably an electric motor drive, for moving the ram 36 toward the differential housing 40 to insert the tube 38 and away from the housing 40 after assembly is complete. During press operation, the ram 36 is controlled by a computer 52, such as a computer using computer numerical control (CNC) or direct numerical control (DNC) or a programmable controller, that determines how far the ram 36 inserts the axle tube 38 into the housing 40 relative to the locator 46 for offsetting any variation in position of the mounting flange 44 on the tube 38 as well as any deflection of the press 32 and tube 38 during assembly to precisely locate the mounting flange 44 in relation to the locator 46 in the differential housing 40. Preferably, only a single computer 52 is used where a pair of rams 36 are used to insert a pair of axle tubes 37 and 38 into the differential housing 40.

To determine any variation in position of the flange 44 on the tube 38 so its mislocation can be offset when inserting the axle tube 38 into the housing 40, a probe 54 is carried by the ram 36 for measuring the distance from one end of the tube 38 to the flange 44. To determine deflection of the tube 38 and press 32 during insertion, the computer 52 communicates with a sensor 56 to determine the force being applied by the ram 36 to the tube 38. If a pair of presses 32 and 34 are used to substantially simultaneously insert a pair of axle tubes 37 and 38 into the differential housing 40, the force of insertion of each tube 37 and 38 is preferably compared to offset any deflection and/or shifting in the differential housing fixture 66 and/or axle tube fixtures 68 due to any imbalance in axle tube insertion forces. Another sensor, such as the shaft encoder 58 shown carried by the press drive 50 in FIG. 2, communicates with the computer 52 so that during press operation the computer 52 can accurately determine the position of the ram 36, and hence, the depth of insertion of the axle tube 38 into the differential housing 40 relative to the locator 46.

Although the shaft encoder 58 is shown in communication with the drive in FIG. 2, the encoder may also be in communication with the ballscrew 48, as is shown in FIG. 4, for accurately indicating the position of the ram 36. So that the axle tube 38 can be accurately inserted into the differential housing 40, under the guidance of the computer 52, the press 32 inserts the tube 38 into the housing 40 until the mounting flange 44 is located a desired fixed distance, CDR (FIG. 15), from the locator 46 in the housing 40 to ensure accurate positioning of a vehicle wheel hub assembly (not shown) mounted to the flange 44 after insertion is completed.

Before or during the initial portion of press-fitting the tube 38 into the housing 40, the computer 52 communicates with the probe 54 to determine any variation in position of the mounting flange 44 on the tube 38 and calculates an offset to be added or subtracted to a predetermined axle tube insertion depth, FDR (FIG. 10), so that that the flange 44 will be accurately finally located when inserted with respect to the differential housing locator 46, even if the flange 44 is actually mislocated on the tube 38 relative to the end of the tube 38 on which the ram 36 bears. During assembly, the computer 52 communicates with the force sensor 56 to determine the amount of force being applied by the ram 36 to the tube 38 during insertion and calculates a second offset to be further added to the axle tube insertion depth to compensate for compression of the tube 38 and deflection of the press 32 due to the force being applied by the ram 36 to the tube 38. As a result of deflection caused by the applied force, the tube 38 is preferably inserted slightly deeper into the differential housing 40 than the first predetermined depth of insertion so that the mounting flange 44 will be accurately located relative to the differential housing 40 when the tube 38 "springs back" moving the mounting flange 44 slightly away from the housing 40 when the ram 36 is retracted from the tube 38 after assembly is finished.

If a pair of presses 32 and 34 are used to insert a pair of axle tubes 37 and 38 into the differential housing 40 at the same time, the force of insertion of each tube 37 and 38 into the housing 40 is preferably compared by the computer 52 and a third offset is determined and applied to the depth of insertion of each tube 37 and/or 38 to compensate for any deflection and/or shifting in the differential housing fixture 66 and/or axle tube fixtures 68 due to any imbalance in axle tube insertion forces. By offsetting deflection and possible shifting of the workpiece fixtures 66 and 68 due to the tubes requiring different forces to insert them during assembly, accurate location of the mounting flange 44 of each tube 37 and 38 relative to the differential housing locator 46 is further assured.

Press Construction

As is shown in FIGS. 1 and 2, the press 32 has a base 60 carried on a foundation 62 by a plurality of spaced apart feet 64 that preferably also isolate the press 32 from vibration during operation. Fixed to the base 60 of the assembly station 30 is a fixture 66 for receiving the differential housing 40 therein, locating the housing 40 in the fixture 66 by referencing its locator 46 and clamping the housing 40, all in preparation for insertion of the axle tubes 38 after the housing 40 has been located and clamped. To support and generally coaxially align the axle tubes 38 relative to the differential housing 40 and press rams 36, there is a pair of axle tube fixtures 68 fixed to the base 60 adjacent the differential housing fixture 66.

As is shown more clearly in FIG. 3, the axle tube 38 and differential housing 40 are located so that an end 70 of the tube 38 adjacent the housing is generally coaxial with an opening 72 in the housing 40. So that the axle tube 38 will be permanently retained in the housing 40 after insertion, the opening 72 in the differential housing 40 has a sufficiently smaller diameter, CD, than the outer diameter, TD, of the tube 38 to provide an interference fit, such as preferably a heavy force fit or shrink fit, with the tube 38.

As is shown in FIGS. 1 and 2 and also illustrated more clearly in FIGS. 4 through 6, the ram 36 is operably coupled to one end of the ballscrew assembly 48 and is supported by a carriage 80 with shoes 82 slidably received on a pair of spaced apart guideways 84 fixed to the base 60 for enabling the ram 36 to be moved toward and away from the axle tube 38 during press operation. At its free end, the ram 36 has a locator 86, such as preferably a V-notch locator or alternatively a mandrel, for engagement with the hollow axle tube 38 to prevent the tube 38 from sliding around on the ram 36 during press operation. This locator 86 does so by preventing radial movement of the tube 38 on the ram 36 during operation helping to maintain accurate location of the end of the tube 38 relative to the ram 36. The other end of the ball screw 48 is rotatively supported by a thrust bearing assembly 88 fixed by a mount 90 to the base 60 for resisting a reaction force created during press operation to insert the axle tube 38 into the differential housing 40.

As is shown in more detail in FIG. 6, the ballscrew assembly 48 has a screw shaft 100 coupled to the gear reducer 92 and which has a necked-down portion 102 preferably received in a single row, single cone, tapered thrust roller bearing 104 carried by the thrust bearing assembly 78. Although a single row, single cone, tapered thrust roller bearing 104 is shown, another suitable type of thrust bearing could also be used. As is depicted in FIG. 4, the bearing assembly 88 also has a second thrust bearing 106 at its opposite end adjacent the gear reducer 92. Extending outwardly from the thrust bearing assembly 88, the screw shaft 100 is received in a ball nut 108 secured to the ram 36 and has a plurality of threads 110 that function as bearing raceways for receiving ball bearings. The ball nut 108 has a collar 112 at one end that is fixed by socket head screws 114 (FIG. 4) to the ram 36.

A plurality of ball bearings 116 received in the screw raceways 110 and raceways 118 and ball guides 120 inside the ball nut 108 along with the helical angle of the raceways 110 and 118 permit rotational movement of the drive output shaft 94, gear reducer 92, and screw shaft 100 to be translated into movement of the ram 36 along guideways 84 toward and away from axle tube 38, depending upon the direction of rotation of the drive shaft 94. To permit retraction of the ram 36 away from the end of the axle tube 38, the ram 36 has a central bore 122 for providing sufficient clearance to receive the screw shaft 100, as is illustrated in phantom in FIG. 4.

As is also shown in FIGS. 1 and 4, a shaft 124 with a stop nut 125 at its free end extends outwardly from the ram carriage 80 and is received in a stop block 126 fixed to the base 60 for preventing over-retraction of the ram 36 away from the axle tube 38. Preferably, after assembly is completed, the nut 125 of the shaft 124 bears against the stop block 126 to prevent the ram 36 from being retracted beyond its home position, such as is depicted in FIG. 1. When retracted to its home position, the ram 36 is sufficiently far enough removed from the axle tube end to provide clearance for permitting unloading of the axle assembly 42 and, thereafter, loading of another axle tube 38 to be assembled.

The probe assembly 54 is shown more clearly in FIGS. 7A through 7D. The probe assembly 54 has a locator plate 130 secured to one end of a reciprocable rod 132 of a cylinder 134 that is carried in a channel 136 in the press ram 36 and is fixed to the ram 36. As is depicted in phantom in FIG. 7C, during probe operation, with the ram 36 bearing against the axle tube end, the rod 132 is extended from the ram 36 until a locator surface or button 138 on the plate 130 bears against an outboard axial surface 140 (FIGS. 7C and 7E) of the mounting flange 44 enabling the distance, AR, (FIGS. 7C and 7E) from the end of the axle tube 38 to the mounting flange 44 to be measured for determining any deviation from the ideal or designed position of the mounting flange 44 from the end of the axle tube 38. During extension of the cylinder rod 132, a pair of guide rods 142 and 144, received in bores 146 and 148 (FIG. 7D) inside the ram 36 and secured by socket head screws to the locator plate 130, resist tilting or skewing of the plate 130 and thereby prevent mislocation of the locator button 138 to ensure accurate measurement of the actual location of the mounting flange 44 relative to the ram 36 and, hence, axle tube end.

As the probe cylinder 134 is moving the locator plate 130 toward the mounting flange 44, a position-indicating magnet 150, secured by a bracket 152 to adjacent one end of elongated guide rod 142, travels in unison (shown in FIG. 7C) with the locator button 138 along a probe rod 154 that is fixed by a bracket 156 to the ram 36. The actual distance, AR, from the mounting flange 44 to the end of the axle tube 38 is determined by measuring the travel of the magnet 150 along the probe rod 154, as indicated by its distance from a proximity sensor 160, and is adjustably fixed by a bracket 162 to the ram 36. As is also shown, the proximity displacement sensor 160 preferably communicates with the computer 52 by an electrical cable 164.

Figure 7A:
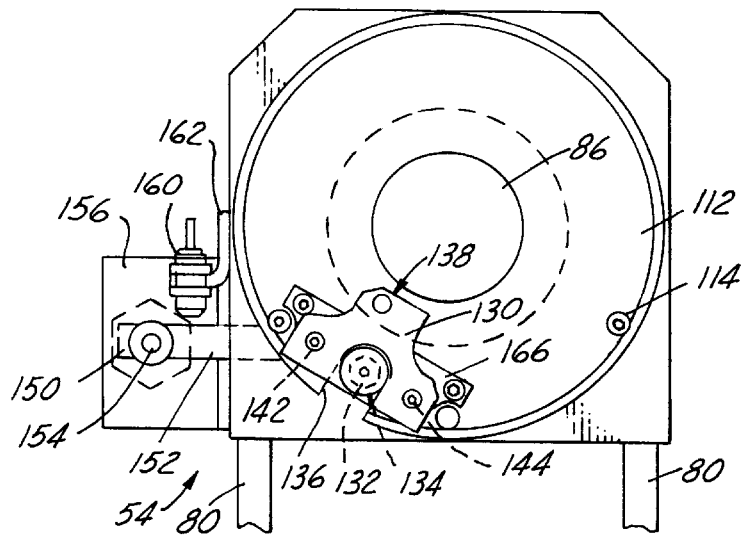
FIG. 7A is an enlarged front view of the press ram shown in FIG. 5 illustrating in more detail the components and construction of the probe assembly.
Figure 7C:
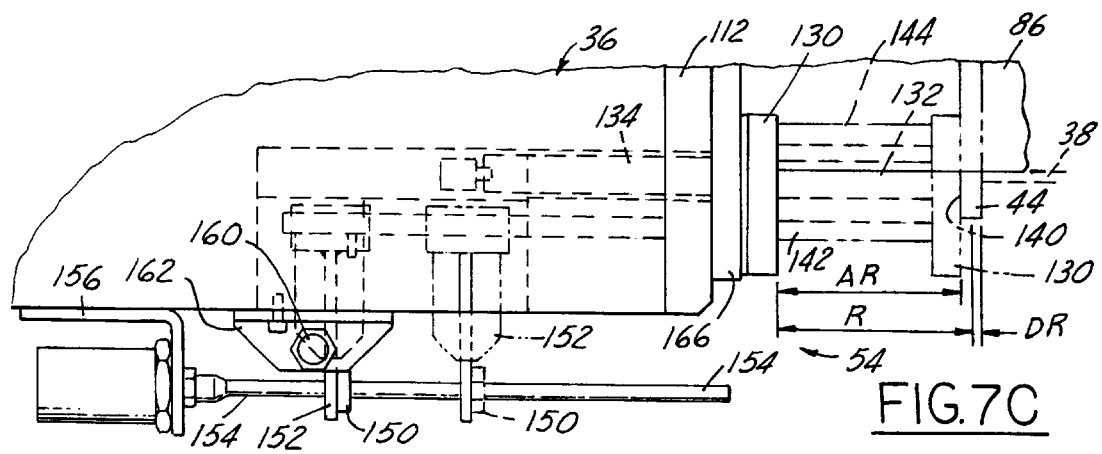
FIG. 7C is an enlarged partial top view of the ram and probe assembly taken along line 7B—7B of FIG. 5.
Figure 7B:
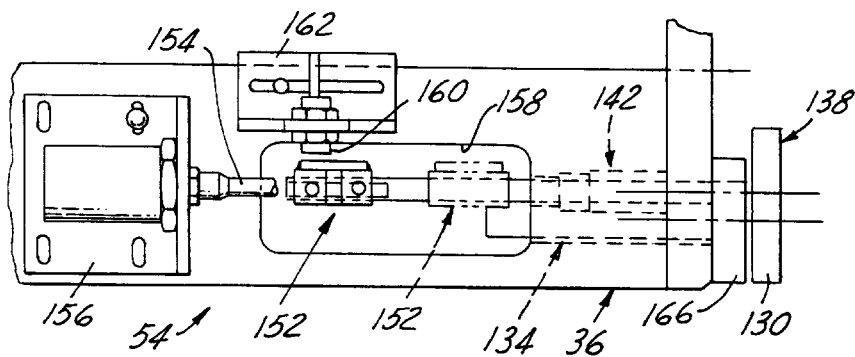
FIG. 7B is an enlarged left-hand partial side view of the ram and probe assembly taken along line 7A—7A of FIG. 5 with parts removed for clarity.
Figure 7E:
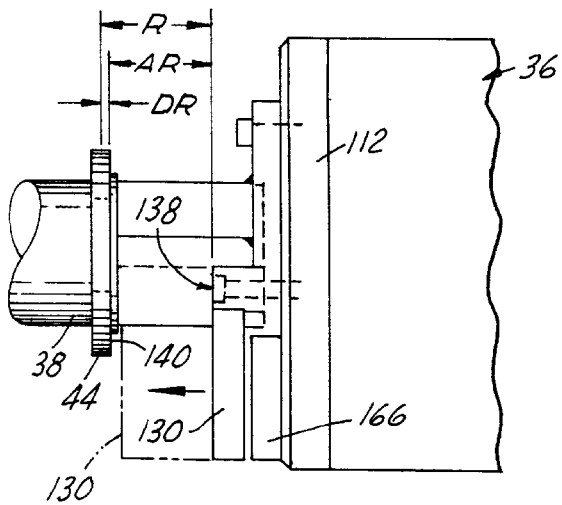
FIG. 7E is a right-hand partial side view of the ram and probe assembly taken along line 7D—7D of FIG. 5.

To permit the magnet 150 to travel in unison with the locator probe plate 130, there is an aperture 158 in the sidewall of the ram 36 of sufficient length to accommodate at least the full possible distance that the probe 54 is capable of extending the locator plate 130 outwardly from the ram 36 to measure the mounting flange distance, as is illustrated more clearly in FIG. 7B. After measurement of the flange distance is completed, a stop plate 166 on the end of the ram 36 limits retraction of the probe locator plate 130 and provides a positive stop for helping to maintain accurate location of the plate 130 with respect to the ram 36 and high repeatability of accurate measurement of the mounting flange location.

Figure 7D:
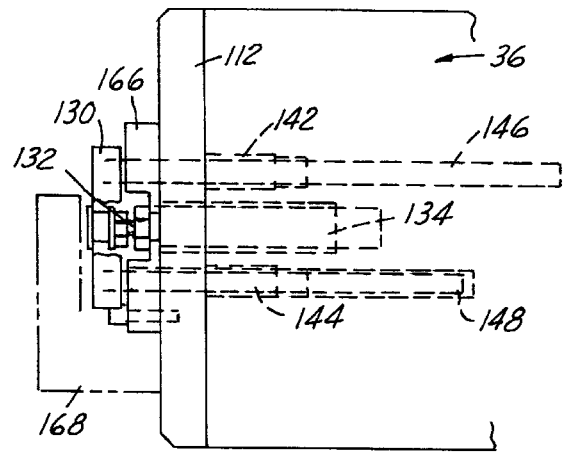
FIG. 7D is a partial top view of the ram and probe assembly taken along line 7C—7C of FIG. 5 with parts removed for clarity.

To calibrate the locator probe 54, a mastering block 168 is used to "zero" the locator probe plate 130 by providing a locator reference relative to the press ram 36, as is shown in phantom in FIG. 7D. To "zero" the probe 54 and accurately locate the plate 130 with respect to the ram 36, the mastering block 168 is mounted on the ram 36 and the locator plate 130 is extended outwardly from the ram 36 until its locator button 138 bears against the block 168. After the button 138 is brought to bear against the mastering block 168, the position-indicating signal to the computer 52 is set as a "zero", making the precise reference location of the locator plate 130 relative to the press ram 36 as a known and fixed constant.

Accurately Locating the Axle Tube Mounting Flange

Referring additionally to FIGS. 8 through 15, since the location of the locator probe plate 130, more particularly its locator button 138, is known relative to the press ram 36, the distance the locator plate 130 extends outwardly from the ram 36 when actually locating the mounting flange 44 on the axle tube 38 can be precisely determined for accurately measuring the actual flange distance, AR from the axle tube end. This actual flange distance, AR, is used by the computer 52 for determining how much the actual mounting flange distance from the end of the axle tube 38 deviates from the intended manufacturing mounting flange distance, R, so that the first predetermined depth of axle tube insertion, FDR, can be increased or decreased by an amount (offset), AFDR, that is dependent on this deviation or, more particularly, the difference between R and AR. Preferably, the intended mounting flange location, R, is stored as a constant within the computer 52, such as within a memory register of the computer, for use in determining deviation in mounting flange location.

For the right-hand axle tube 38, in determining this offset used to adjust the depth of insertion of the right axle tube 38 (see also FIGS. 10–15), the computer 52 simply subtracts the constant, R, from the actual mounting flange location, AR:

$$DR = AR - R \qquad \text{(Equation A)}$$

where:
- DR is the amount of deviation from R in the right-hand mounting flange distance;
- AR is the actual measurement of the right-hand mounting flange distance; and
- R is the ideal or designed right-hand mounting flange distance.

For the left-hand axle tube 37, in determining the offset used to adjust the depth of insertion of the left axle tube 37 (see FIGS. 10–15), the computer 52 simply subtracts the constant, L, from the actual mounting flange location, AL:

$$DL = AL - L \qquad \text{(Equation B)}$$

where:
- DL is the amount of deviation from L in the left-hand mounting flange distance;
- AL is the actual measurement of the left-hand mounting flange distance; and
- L is the ideal or designed left-hand mounting flange distance.

Figure 8:
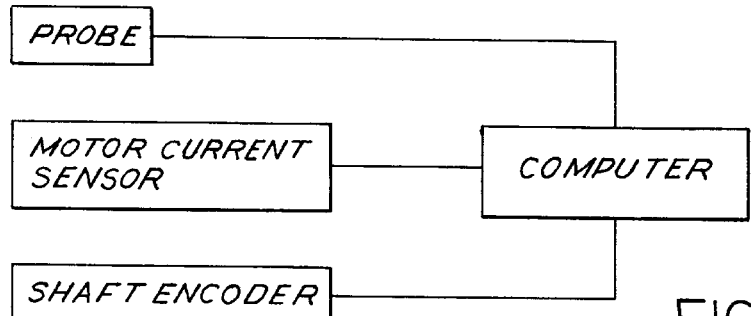
FIG. 8 is a schematic diagram illustrating a computer of the press and sensors for communicating with the computer during press operation to offset tolerance variations in the position of the flange on the axle tube and deflections encountered during assembly of the tube to the differential housing.

As is schematically depicted in FIG. 8, in addition to communicating with the probe 54 prior to insertion of the axle tube 38 to determine any offset to be applied to the first predetermined depth of insertion, the computer 52 also communicates with the ram position sensor 58 and the press ram force sensor 56 during insertion of the tube 38 into the differential housing 40. Preferably, the ram position sensor is a shaft encoder 58 that is in communication with either the drive motor output shaft 94 (FIGS. 1 and 2) or the ballscrew shaft 100 (FIG. 4 and in phantom in FIG. 2) to provide the computer 52 with the precise location of the ram 36 by sensing rotation of either the drive output shaft 94 or the ballscrew shaft 100. Preferably, a shaft encoder 58 is used because of its ability to precisely sense even a very small amount of shaft rotation, such as less than a minute or a second or less of angular rotation, enabling the computer 52 to translate shaft rotation into linear movement of the ram 36 and thereby determine the precise location of the ram 36 during insertion. By being able to determine the precise location of the ram 36 at all times during operation, the computer 52 is thereby able to precisely and accurately control the depth of insertion of the axle tube 38 into the differential housing 40.

Offsetting Force-Related Deflection of the Press

During insertion of the tube 38 into the housing 40, the computer 52 communicates with the force sensor 56 to determine how much force is being applied to the axle tube 38 by the ram 36 during insertion of the tube 38 into the housing 40 for determining an offset, δ, to be added to the second calculated depth of insertion of the tube 38. Using a lookup table 170, such as that shown in FIG. 9A, the applied force of insertion is then used by the computer 52 to lookup a predicted amount of deflection, δ, that the press 32 and axle tube 38 will undergo during insertion. This deflection value, δ, is used to determine the offset, δ, to be applied to the second calculated depth of tube insertion to compensate for the deflection, δ, so that the mounting flange 44 will be accurately located relative to the locator 46 in the differential housing 40 when the force from the ram 36 is removed upon completion of the assembly 42. Preferably, the offset, δ, that is added to the depth of axle tube insertion is equal to the deflection, δ, of the press 32 and axle tube 38 during insertion of the tube 38 into the differential housing 40.

Alternatively, for empirically determined force-deflection data, regression, such as linear or polynomial regression, may be used to determine an equation representative of the relationship between the applied force and the press and axle tube deflection, δ. The equation can be used by the computer 52 for calculating deflection, δ, after the applied force has been determined during press operation. If desired, since applied force is a function of drive motor torque and drive motor torque is a function of drive motor electrical current, the empirical data may consist of drive motor current-deflection data and regression may be used by the computer 52 to determine an equation for predicting deflection, δ, for a given drive motor current.

During insertion, the axle tube 38 resists insertion into the differential housing opening 72 because the opening 72 is smaller in diameter than the tube 38 for creating a tight fit with the tube 38 when inserted. The press ram 36 exerts sufficient force against the tube 38 to overcome this resistance and insert the tube 38 into the differential housing 40. However, the force applied by the ram 36 to the tube 38 causes the tube 38 to compress or deflect. The force exerted by the ram 36 on the tube 38 also causes the press 32 to deflect because a reaction force is transmitted from the tube 38, due to resisting insertion, to at least some of the various components of the press 32, such as for example: the ram 36, its carriage 80, the ballscrew 48, the thrust bearing 88, its mount 90, the base 60 of the press 32 as well as perhaps other components. When the force is removed after insertion is completed, the axle tube 38 "springs back" or decompresses moving the mounting flange 44 with it as it "springs back".

Usually, the press 32 is substantially rigid and undergoes less deflection than the tube 38 during insertion. However, the deflection of the press 32 during insertion requires the ram 36 to travel further toward the housing 40 to reach the same location to drive the axle tube 38 into the housing 40 to the proper depth than if the press 32 were perfectly rigid and did not deflect. Furthermore, since the axle tube 38 deflects by compressing axially lengthwise in response to the insertion force applied by the ram 36, the ram 36 must travel still further toward the differential housing 40 to insert the tube 38 into the housing to the proper depth such that its mounting flange 44 will be accurately located relative the differential housing locator 46 when assembly is completed. As a result, the offset, δ, determined using the predicted amount of tube and press deflection, δ, is a positive offset that is added to the second calculated depth of tube insertion for causing the axle tube 38 to be inserted more deeply into the differential housing 40 such that when the tube 38 "springs back", the mounting flange 44 will be accurately located with respect to the locator 46 in the differential housing 40. Preferably, when assembly is completed, the mounting flange 44 is accurately located within an allowable tolerance variation of ±0.006 inches or less of the desired distance from the differential housing locator 46.

However, the insertion force varies from axle tube 38 to axle tube 38 and differential housing 40 to differential housing 40, causing the deflection of the tube 38 due to it being compressed during insertion and deflection of the press 32, as a result of the insertion force, to vary from one axle assembly to another axle assembly. Therefore, to ensure accurate location of the mounting flange 44 when inserted, the computer 52 refers to the lookup table 170 upon determining the force being applied to the axle tube 38 and selects the appropriate deflection, δ, associated with the insertion force, to use in determining the offset, δ, to add to the second calculated depth of tube insertion. Linear interpolation of the table 170 may be used to determine a deflection, δ, where the actual force applied by the ram 36 to the tube 38 falls in between two forces listed in the table 170. Alternatively, the indicated applied force can be inputted into a regression equation, instead of using the lookup table 170, to determine the predicted deflection, δ, of the tube 38 and the press 32. Preferably, the applied force is determined by the computer 52 when the second calculated full depth of tube insertion is nearly reached and the offset, δ, due to the predicted deflection, δ, of the tube 38 and press 32 is added to the depth of insertion increasing how deeply the tube 38 is inserted into the differential housing 40, preferably by the amount of the predicted deflection, δ.

Preferably, to determine the force the ram 36 is applying against the tube 38, the tube insertion force sensor 56 determines the torque that the drive 50 is experiencing as a result of the force the ram 36 is applying to the tube 38 during insertion. Preferably, the force sensor 56 is a current sensor for measuring the current of the electrical power being supplied to the electrical press drive motor 50. Since, electric motor current is a function of the torque an electric motor experiences while under load, the torque the drive motor 50 is experiencing during insertion of the tube 38 can be determined. Therefore, since drive motor torque is a function of the force the ram 36 is applying to the tube 38 during insertion, the force applied by the ram 36 can be determined by measuring motor current during press operation. Preferably, the motor current is sensed during insertion of the tube and communicated to the computer 52 so that the computer 52 can determine the force the ram 36 is applying to the axle tube 38.

Preferably, in creating the lookup table 170 of predicted deflections, the entire amount of deflection, δ, for a given applied force is determined empirically through routine experimentation and engineering calculations that may be manually performed or solved through the use of a computer. For example, knowing the length of the axle tube 38 and its material or materials of construction and using mathematical relationships derived from strength of materials theory and research, the predicted deflections of an axle tube for a given set or range of insertion forces can be determined. The predicted deflections of the press 32 can also be similarly determined using these relationships or can be determined empirically using deflection sensors or sensing equipment, such as strain gauges, applied to different components of the press, such as the ram 36, its carriage 80, the thrust bearing assembly 88, its mount 90, the base 60 and any other such press components to determine the total deflection of the press for the wide range of forces likely to be encountered during press operation. For example, through experimentation it has been found empirically that a given press of this construction undergoes a lineal deflection of approximately 0.010 inches in response to each 10,000 pounds of force applied by the ram 36 to the axle tube 38 during insertion. If necessary, to periodically calibrate the table 170, and for adjusting the table 170 to accommodate an axle tube having a different construction or made of a different material, routine experimentation and the like may be performed to create a new lookup table or simply to adjust its values.

Preferably, the table 170 is stored for use by the computer 52 in looking up the predicted deflection, δ, associated with the force the ram 36 is applying to the axle tube 38 in inserting the tube 38 into the differential housing 40. Preferably, the table 170 is incorporated into computer software run by the computer 52 to determine the necessary offsets to be applied to the depth of axle tube insertion to ensure accurate location of the mounting flange 44 relative to the differential housing locator 46. Alternatively, the table 170 can be stored on a storage device such as disk drive, erasable programmable read-only-memory (EPROM) or the like that is accessible by the computer 52 and used by its software program to look up the predicted deflection value, δ, from the table 170 and is modifiable for adjusting the table 170 for different axle tubes or assembly setups.

Offsetting Force-Related Deflection and/or Shifting of the Fixtures

If two presses 32 and 34 are used to substantially simultaneously insert a pair of axle tubes 37 and 38 into a differential housing 40, the force of insertion of each tube is also compared by the computer 52 for determining if one of the forces of axle tube insertion is greater than the other. If there is such an insertion force imbalance, IF, the computer 52 preferably determines an offset, ε, and applies it to the depth of insertion of each tube so that it compensates for any deflection and/or shifting of the workpiece fixtures 66 and 68 of both presses 32 and 34 due to the insertion force imbalance. Preferably, since the effect of such a force imbalance is that it largely shifts the locations of both axle tubes 37 and 38, the differential housing 40 and their associated fixtures 66 and 68 in the direction of the force imbalance, IF, the offset determined, ε, is added to the depth of insertion of one axle tube and subtracted from the depth of insertion of the other axle tube.

Figure 9A:
FIG. 9A is a lookup table used by the computer to predict deflection during assembly in response to the force being applied to the tube when it is being inserted into the differential housing.
Figure 9B:
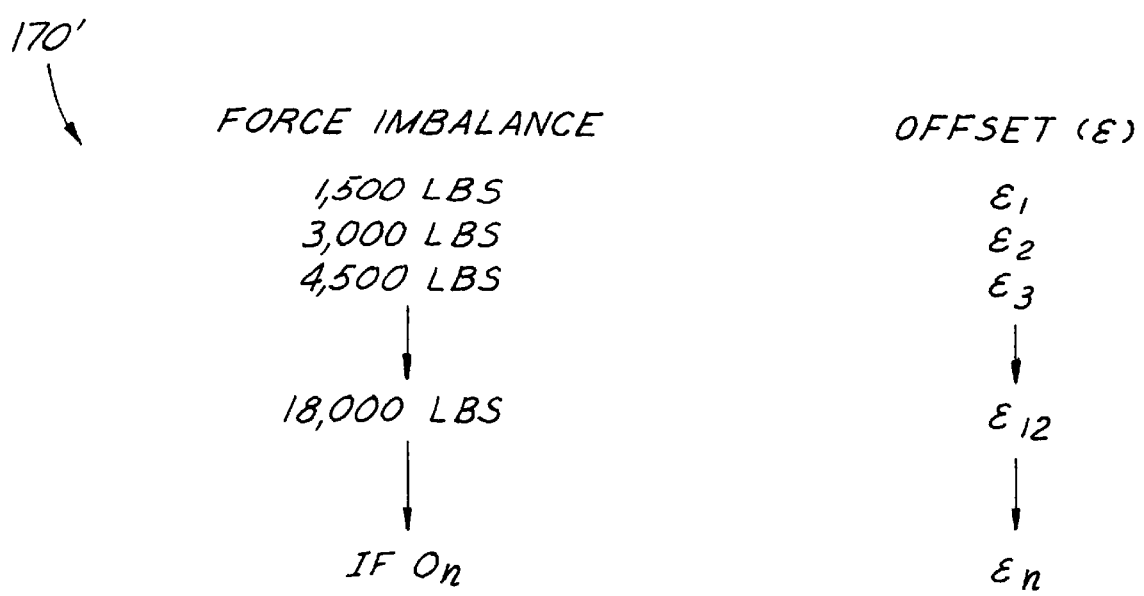
FIG. 9B is a lookup table used by the computer to predict deflection and shifting of the workpiece fixtures during assembly in response to any imbalance in the force being applied to each tube when it is being inserted into the differential housing.

Preferably, the amount of force imbalance determined by the computer 52 is used to select the amount of offset, ε, from a lookup table, such as modified table 170' shown in FIG. 9B, to apply to the depth of insertion of each axle tube so that the mounting flange 44 of each tube will be accurately located in spite of any insertion force imbalance. Preferably, a single, combined lookup table, having the information presented in both FIGS. 9A and 9B, can be used having the values of press deflection, $δ_n$, and force imbalance offset, $ε_n$, corresponding respectively to applied insertion forces, $F_n$, and imbalance forces, $IF_n$. Preferably, in creating the lookup table 170' of predicted force imbalance offsets, the amount of the offset, ε, for a given amount of insertion force imbalance is determined empirically through routine experimentation and engineering calculations that may be manually performed or solved through the use of a computer.

Therefore, both the variation in location of the mounting flange 44 on the axle tube 38, prior to insertion, the deflections of the tube 38 and press 32, as well any deflection and/or shift in the workpiece fixtures 66 and 68 during insertion, can be accounted for to precisely control the depth of insertion of the tube 38 into the differential housing 40 so that the mounting flange 44 is accurately located a desired distance away from the differential housing locator 46, such that its location is preferably within an acceptable tolerance window of ±0.006 inches or less of the desired distance from the locator 46.

Use and Operation

In use and operation of both presses 32 and 34 of this invention, as is depicted by FIGS. 10 through 15, the differential housing 40 is loaded onto its fixture 66 and located in the fixture 66 with respect to its locator 46 before the fixture 66 clamps the housing 40 in preparation for receiving a pair of axle tubes 37 and 38. The left axle tube 37 and right axle tube 38 are loaded into their respective fixtures 68, radially located so that one end is generally coaxial with the tube opening 72 in the differential housing 40 and the other end is generally coaxial with the locator 86 on the ram 36.

Figure 10:
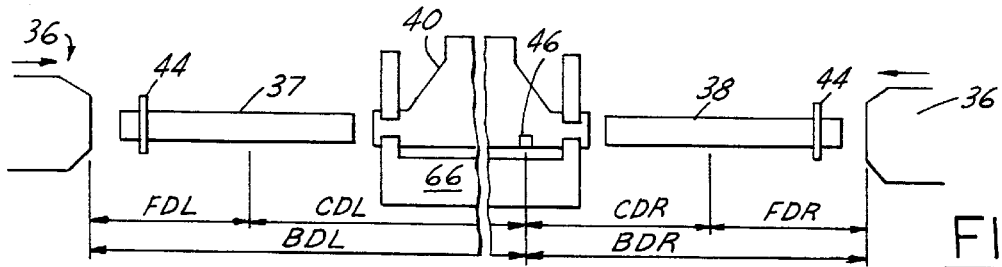
FIG. 10 is a simple pictorial diagram of the assembly station illustrating the locations and desired pre-determined final locations of the mounting flanges, axle tubes, press rams and the differential housing before assembly.
Figure 11:
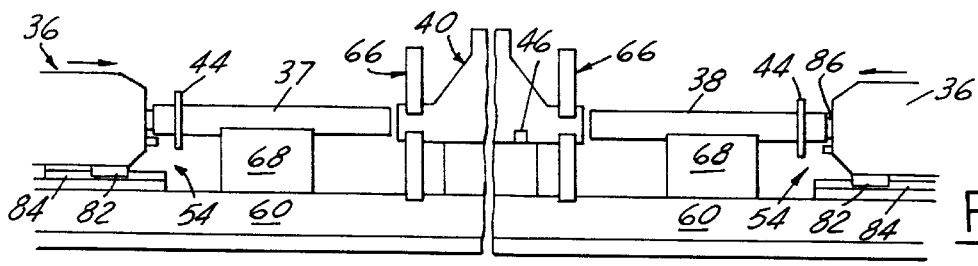
FIG. 11 is a simplified illustration of the assembly station with parts missing for clarity depicting the press before assembling the axle tubes to the differential housing.

Referring more particularly to FIGS. 10 and 11, the presses 32 and 34 and workpieces 38 and 40 are shown before assembly. In FIG. 10, each ram 36 is shown in its home position indicated by its distance BDR and BDL away from the differential housing locator 46. Preferably, after completing assembly, each ram 36 returns to its home position and, therefore, is accurately located a distance BDR and BDL away from the locator 46 of the next differential housing loaded onto fixture 66.

Programmed into the software or a memory location of the computer 52 are dimensions FDL and FDR which are predetermined full depth of insertion distances that the left-hand axle tube 37 and right hand tube 38, respectively, must be inserted into the differential housing 40 to at least closely achieve the critical customer-required mounting flange locations from the differential housing locator 46, shown respectively as CDL and CDR in FIG. 10.

To enable the assembly station 30 to accommodate a wide variety of differential housings 40 and axle tubes 38 of different types, sizes and lengths, the variables FDL, FDR, CDL, and CDR and if necessary, BDL and BDR can be programmed into the control software executed by the computer 52 during operation of each press 32 and 34 or stored in memory locations of the computer 52 accessible by its control software. Therefore, axle tubes having lengths, for example, of thirty-six inches, forty-eight inches or another length, and with mounting flanges 44 located at different positions on the respective tube relative to its tube end can be assembled by a press of this invention by simply assigning the appropriate location values to the aforementioned variables so that the each type of axle tube 38 will be inserted into its corresponding differential housing 40 such that its mounting flange 44 is accurately located relative to the housing locator 46 when assembly is completed.

During operation, FDL and FDR are respectively adjusted by offset, DL and DR, to account for any deviation in mounting flange location relative to each axle tube end bearing against the ram 36 and offset, $\delta_L$ and $\delta_R$, due to the deflection of each axle tube 37 and 38 and the left and right presses 32 and 34 due to the applied forces of insertion, so that the mounting flange 44 of each tube 37 and 38 is respectively accurately located CDL and CDR from the differential housing locator 46.

During operation, the computer 52 adds and/or subtracts the offsets it determines to or from FDL and FDR for ensuring that each axle tube 37 and 38 is accurately inserted into the differential housing 40 such that its mounting flange 44 is accurately located a distance CDL and CDR away from the differential housing locator 46. As such, the offset required to account for any variation in position of the mounting flange 44 on each axle tube 37 and 38 prior to insertion, and the offset required to compensate for deflection of each tube 37 and 38 and the presses 32 and 34 are applied to FDL and FDR to respectively adjust the depth of insertion of each tube 38 so that the mounting flange 44 is located within an acceptable tolerance variation of preferably ±0.006 inches or less with respect to the locator 46 in the differential housing 40.

At the beginning of an assembly operation, each ram 36 is advanced toward the differential housing 40 and the axle tubes 37 and 38 they will insert into the housing 40. Preferably, the movement of both rams 36 are sequenced so that both tubes 37 and 38 are substantially simultaneously inserted into the differential housing 40. To move each ram 36 toward the housing 40, the drive motor 50 is energized rotating its output shaft 94 thereby causing the gear reducer 92 to rotate the ballscrew shaft 100. As the ballscrew shaft 100 rotates, the ball nut 108 travels along the shaft 100 causing the ram 36 to advance toward its axle tube 38 and the differential housing 40. After the rams 36 have inserted the tubes 37 and 38 into the differential housing 40, the direction of rotation of the drive output shaft 94 is reversed causing the rams 36 to retract away from the differential housing 40 to their home positions a distance BDL and BDR away from the differential housing locator 46 removing the insertion force being applied to the tubes 37 and 38.

Figure 12:
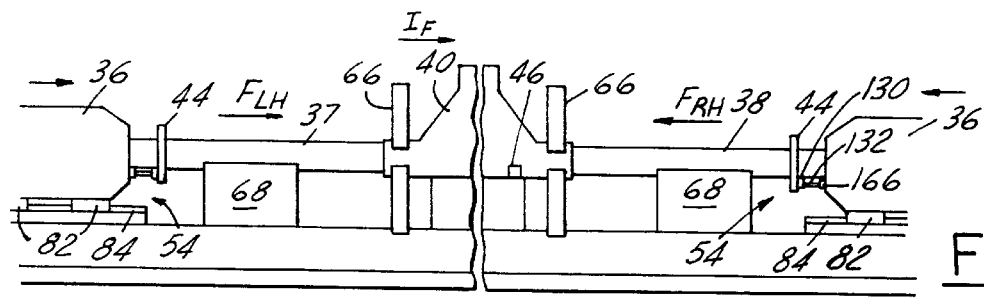
FIG. 12 is a simplified illustration of the assembly station with parts missing for clarity depicting the press during assembly.
Figure 13:
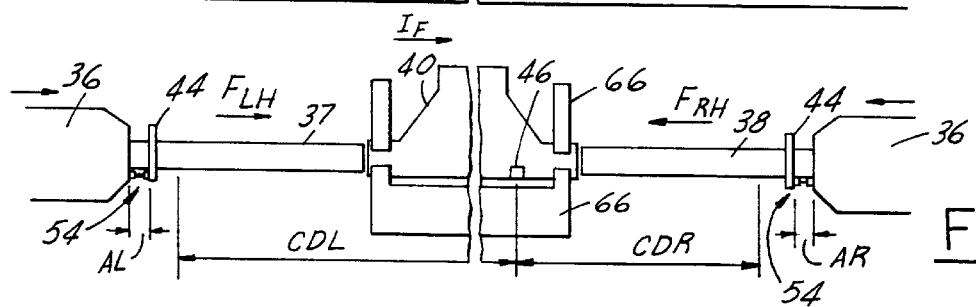
FIG. 13 is a simple pictorial diagram of the assembly station illustrating the location of each mounting flange relative to the end of its axle tube, the press rams and the differential housing during assembly.

As the rams move toward the differential housing 40, the axle tube locator 86 of each ram 36 is telescopingly received inside one end of its axle tube 37, 38 centering the tube on the ram. As is illustrated in FIGS. 12 and 13, each ram 36 is extended until it bears against the outer axial end of the tube 37 and 38 ensuring accurate location of each ram with respect to the end of the tube 37 and 38. Thereafter, the probe rod 134 of each probe 54 is extended outwardly from the ram 36 until the locator button 138 on its locator plate 130 bears against the outboard axial surface 140 of the mounting flange 44 providing to the computer 52 the actual distances, AL and AR, from the end of each tube 37 and 38 to its mounting flange 44. Using equations A and B repeated below, the computer 52 calculates the amount that each mounting flange 44 deviates, DL and DR from constants L and R which represent the intended mounting flange distances from the end of each tube:

$$DR = AR - R \quad \text{(Equation A)}$$

$$DL = AL - L \quad \text{(Equation B)}$$

for determining how much to offset the pre-determined depth of axle insertion distances, FDL and FDR. To calculate the first approximation of actual ram travel and, therefore, the depth of insertion of each axle tube, while taking into account any deviation in mounting flange location, DL and DR, on each tube, the computer 52 uses the following equations:

$$AFDL_1 = FDL - DL \quad \text{(Equation C)}$$

where:

$AFDL_1$ is the first calculated depth of intended tube insertion (ram travel) including the offset due to deviation of the mounting flange distance from the end of the left-hand axle tube;

FDL is the pre-determined left-hand axle tube insertion depth; and

DL is the offset due to deviation in the location of the mounting flange on the left-hand axle tube.

and:

$$AFDR_1 = FDR - DR \qquad \text{(Equation D)}$$

where:

AFDR$_1$ is the first calculated depth of intended tube insertion (ram travel) including the offset due to deviation of the mounting flange distance from the end of the right-hand axle tube;

FDR is the pre-determined right-hand axle tube insertion depth; and

DR is the offset due to deviation in the location of the mounting flange on the right-hand axle tube.

Preferably, the offset to the depth of tube insertion to account for any variation or deviation in the position of the mounting flange 44 on each axle tube 37 and 38 is determined "on the fly" while each ram 36 is advancing toward the differential housing 40. As each ram 36 advances further toward the differential housing 40, the computer 52 communicates with each shaft encoder 58 to monitor the precise position of each ram 36 and the depth of insertion of each tube 37 and 38. As each ram 36 approaches its first calculated full depth of insertion position, AFDL$_1$ and AFDR$_1$, the computer 52 communicates with the applied force sensor 56 to determine the electrical current of each drive motor 50 for determining the force that each ram 36 is applying to the tube 37 and 38 to insert it into the differential housing 40.

After determining the applied insertion force for each ram 36 (see insertion forces depicted by force vectors F$_{RH}$ and F$_{LH}$ in FIGS. 12 and 13), the computer 52 consults lookup table 170, depicted in FIG. 9A, or a regression equation, and selects, or calculates (if regression is used to determine deflection), a predicted deflection value, $\delta_n$, associated with each applied force for determining the offset to apply to each first calculated depth of insertion, AFDL$_1$ and AFDR$_1$, to account for deflection of each axle tube 37 and 38 and the presses 32 and 34 so that the mounting flange 44 of each tube 37 and 38 will be accurately located with respect to the differential housing locator 46 when insertion is completed.

After determining the insertion force, F$_{RH}$, the left-hand ram 36 is applying against the left-hand axle tube 37 and the force, F$_{LH}$, the right-hand ram 36 is applying against the right-hand axle tube 38, the insertion forces, F$_{RH}$ and F$_{LH}$, are compared by the computer 52 to determine an offset, $\epsilon$, to apply to the depth of insertion of each tube to compensate for any force imbalance, IF. Preferably, the force imbalance, IF, is determined by subtracting one insertion force from the other insertion force for determining the vector difference of the insertion forces, F$_{RH}$ and F$_{LH}$:

$$IF = F_{RH} - F_{LH} \qquad \text{(Equation E)}$$

Preferably, the force imbalance calculated using Equation E is a vector for also indicating the direction of the force imbalance. Since the axle tube experiencing the greater insertion force will shift in the direction of the force imbalance, the vector enables the computer to add the offset, $\epsilon$, to the depth of tube insertion of the tube having the greater insertion force and subtract the offset, $\epsilon$, from the depth of tube insertion of the tube having the lesser insertion force. If there is no force imbalance during assembly, the offset, $\epsilon$, will preferably be zero.

To determine how much to offset insertion of each tube 37 and 38 into the differential housing 40 to compensate for deflection and/or shifting of the workpiece fixtures 66 and 68, the computer 52 selects or determines an offset, E, based on the amount of force imbalance, IF, calculated using the above equation, and applies the offset, $\epsilon$, to the depth of tube insertion of each axle tube. After determining the amount of insertion force imbalance, IF, the computer 52 consults lookup table 170', depicted in FIG. 9B, or a regression equation, and selects, or calculates (if regression is used to determine the offset, $\epsilon$), a predicted offset value, $\epsilon_n$, associated with the associated force imbalance, IF$_n$, and applies the offset, $\epsilon_n$, to the first calculated depth of tube insertion, AFDL$_1$ and AFDR$_1$, to account for any deflection and/or shifting of the workpiece fixtures 66 and 68 during insertion to ensure that the mounting flange 44 of each tube 37 and 38 will be accurately located with respect to the differential housing locator 46 when assembly is completed.

Preferably, since the press and tube deflection results in a positive offset to be added to the first calculated depth of insertion, AFDL$_1$ and AFDR$_1$, for each tube 37 and 38, the computer 52 selects the deflection for each tube 37 and 38 based upon the force that is being applied to the tube and adds this deflection, $\delta_n$, as an offset, $\delta_n$, to the first calculated tube insertion depth:

$$AFDL_2 = AFDL_1 + \delta_{Ln} \pm \epsilon_n \qquad \text{(Equation F)}$$

where:

AFDL$_2$ is the second calculated or actual depth of tube insertion (ram travel) including the offset due to deflection of the press and left-hand axle tube;

$\delta_{Ln}$ is the offset due to the deflection of the press and left-hand axle tube; and $\epsilon_n$ is the offset due to the shifting and/or deflection of the workpiece fixtures 66 and 68.

As is shown in Equation F, the offset, $\epsilon_n$, is preferably added (+) to the depth of left-hand tube insertion when the insertion force, F$_{LH}$, being applied to the left-hand axle tube 37 is greater than the insertion force, F$_{RH}$, being applied to the right-hand tube 38. The offset, $\epsilon_n$, is preferably subtracted (−) from the depth of left-hand tube insertion when the insertion force, F$_{LH}$, being applied to the left-hand axle tube 37 is less than the insertion force, F$_{RH}$, being applied to the right-hand tube 38. However, the magnitude and application of the offset, $\epsilon_n$, using Equation F may be adjusted after empirical testing and/or further routine experimentation to determine how best to select, calculate, and/or determine and apply the offset, $\epsilon_n$, to the depth of tube insertion.

And, for the right-hand axle tube 38:

$$AFDR_2 = AFDR_1 + \delta_{Rn} + \epsilon_n \qquad \text{(Equation G)}$$

where:

AFDR$_2$ is the second calculated or actual depth of tube insertion (ram travel) including the offset due to deflection of the press and right-hand axle tube;

$\delta_{Rn}$ is the offset due to the deflection of the press and right-hand axle tube; and $\epsilon_n$ is the offset due to the shifting and/or deflection of the workpiece fixtures 66 and 68.

The offset, $\epsilon_n$, is added (+) to the depth of right-hand tube insertion when the insertion force, F$_{RH}$, being applied to the right-hand axle tube 38 is greater than the insertion force, F$_{LH}$, being applied to the left-hand tube 37. The offset, $\epsilon_n$, is subtracted (−) from the depth of right-hand tube insertion when the insertion force, $F_{RH}$, being applied to the right-hand axle tube 38 is less than the insertion force, $F_{LH}$, being applied to the left-hand tube 37.

However, the magnitude and application of the offset, $\epsilon_n$, using Equations F and G to adjust the depth of tube insertion may itself be adjusted after empirical testing and/or further routine experimentation to determine how best to select, calculate, and/or determine and apply the offset, $\epsilon_n$, to the depth of tube insertion. For example, insertion force imbalance offset, $\epsilon_n$, may need to be further empirically adjusted to compensate for possible "springback" of the workpiece fixtures 66 and 68 after assembly has been completed due to deflection of the fixtures 66 and 68 during insertion of the axle tubes 37 and 38 into the differential housing 40. Furthermore, it may be necessary to offset the left-hand tube insertion depth and the right-hand tube insertion depth by different amounts for a given amount of force imbalance based upon empirical testing and routine experimentation.

As is also shown in Equations F and G, each tube 37 and 38 is actually inserted deeper into the differential housing 40 than the first calculated insertion depths, $AFDL_1$ and $AFDR_1$, by the amount of the predicted press and tube deflection, $\delta_n$, selected for each applied force by the computer 52 from the lookup table 170. Therefore, during tube insertion the computer 52 communicates with the shaft encoder 58 of each press 32 and 34 to determine the position of the ram 36 of each press 32 and 34 and, hence, how far each ram 36 has traveled from its home position, to determine when the actual depth of insertion, $AFDL_2$ and $AFDR_2$, has been achieved for each axle tube 37 and 38.

Figure 14:
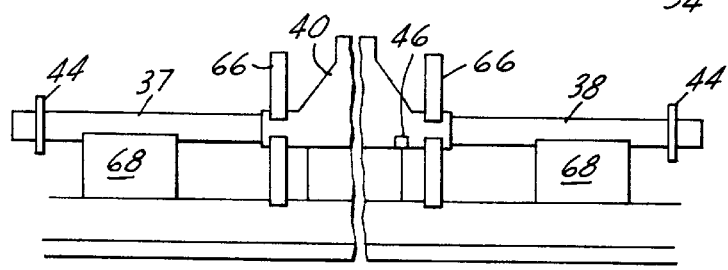
FIG. 14 is a simplified illustration of the axle assembly after the tubes have been inserted into the differential housing.
Figure 15:
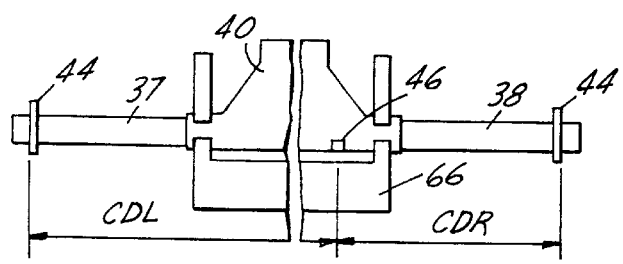
FIG. 15 is a pictorial diagram of the press illustrating location of each mounting flange relative to the differential housing after assembly.

As is shown in FIGS. 14 and 15, when insertion of each axle tube 37 and 38 to the desired depth is completed, each ram 36 is retracted allowing each tube 37 and 38 to "spring back" and thereby position its mounting flange 44 such that it is accurately positioned relative to the differential housing locator 46. As is shown more clearly in FIG. 15, when insertion is completed, the mounting flange 44 of the left-hand axle tube 37 is accurately located a distance CDL away from the differential housing locator 46 and the mounting flange 44 of the right-hand axle tube 38 is accurately located a distance CDR away from the locator 46. Preferably, after insertion of each axle tube 37 and 38 is completed, the axle assembly 42 is unclamped and transferred out of fixtures 66 and 68 and thereafter, another pair of axle tubes and another differential housing to be assembled is transferred into the fixtures 66 and 68, located and clamped.

Preferably, control of the assembly station 30 and each press 32 and 34 is accomplished through computer software loaded into the computer 52 and run by the computer 52. Preferably, the computer software executes at least the following steps during the assembly operation of inserting each axle tube into the differential housing: (1) advancing each press ram toward its axle tube after the differential housing and axle tubes have been loaded, located and clamped in the fixtures; (2) controlling probe operation to measure the distance that each mounting flange is from the end of the axle tube it is mounted on by extending the locator plate of each probe toward the mounting flange until its locator button bears against the flange after the ram has engaged the end of the tube; (3) determining an offset to be applied to the predetermined depth of tube insertion for the tube to account for any deviation in the mounting flange location on the tube; (4) calculating a new depth of axle tube insertion by adding or subtracting the offset due to deviation in the mounting flange location on the tube; (5) further advancing each ram toward the differential housing to insert each axle tube into the housing; (6) monitoring each ram position sensor to sense how far each ram has inserted each tube into the differential housing; (7) communicating with the force-applied sensor to sense how much force the ram is applying to each tube as each ram is approaching the first calculated depth of tube insertion; (8) reading from the lookup table and selecting the predicted axle tube and press deflection value for each tube corresponding to the sensed force of insertion for each tube or inputting each applied force into a regression equation and calculating the predicted axle tube and press deflection; (9) comparing the insertion forces being applied to each axle tube to determine the magnitude and direction of force imbalance and determining and applying an offset to compensate for any deflection and/or shifting of the workpiece fixtures due to force imbalance; (10) calculating a new insertion depth for each tube by adding the amount of each deflection to the first calculated tube insertion depth of each tube and applying the offset compensating for insertion force imbalance to the depth of insertion; (11) moving each ram further toward the differential housing to insert each tube further into the housing until the second calculated or actual depth of insertion is achieved; and thereafter (12) retracting each ram from its axle tube, preferably to its home position, allowing each tube to "spring back" positioning its mounting flange relative to the differential housing locator such that each flange is accurately located with respect to the locator, preferably within an acceptable tolerance of ±0.006 inches or less.

While the present invention has been disclosed in connection with the preferred embodiment thereof, it should be understood that there will be other embodiments which fall within the spirit and scope of the invention and that the invention is susceptible to modification, variation and change without departing from the scope and fair meaning of the following claims.

What is claimed is:

1. A method of press-fitting a first workpiece to a second workpiece to a predetermined axial location between them after press fitting is completed comprising:

(a) providing a first workpiece, a second workpiece, a press for press-fitting the first and second workpieces, the press having a base, a ram carried by the base, a drive in operable communication with the ram for moving the ram, a ram position sensor to sense the axial position of the ram while applying a generally axial force to urge the first and second workpieces together and a computer in communication with the ram position sensor and the drive;

(b) aligning the first and second workpieces along a press-fit axis in a position to be press-fit together;

(c) moving the ram into engagement with one of the first and second workpieces;

(d) with the ram applying a generally axial force to urge the first and second workpieces together;

(e) sensing the force applied by the ram to the one of the first and second workpieces engaged by the ram while applying the force to press-fit the first and second workpieces together;

(f) the computer determining an axial offset from a predetermined axial location for movement of the ram proportional to the sensed force to approximate axial deflection at least one of the first and second workpieces will undergo during press-fitting of the workpiece; and (g) the computer controlling the drive to move the ram to urge the first and second workpieces together and utilizing the determined axial offset and the ram position sensor to control the extent of axial movement of the ram so that the first and second workpieces are press-fit together and accurately located along the press-fit axis with respect to each other after press-fitting is completed and the ram is disengaged from the one workpiece.

2. The method of claim 1 also comprising sensing any deviation in location of a first portion of one of the first and second workpieces relative to a second portion of said one of the first and second workpieces, determining an offset for movement of the ram proportional to said sensed deviation, and utilizing the offset to also control movement of the ram so that the first and second workpieces are urged together and accurately located with respect to said first portion when press-fitting is completed.

3. The method of claim 1 also comprising after step (c) sensing any deflection of the press due to the force being applied to at least one of the first and second workpieces by the ram, determining an offset for the ram proportional to the sensed deflection of the press, and controllably moving the ram to urge the workpieces together and applying the determined offset proportional to the deflection of the press to control movement of the ram so that the workpieces are urged together and accurately located with respect to each other when press-fitting is completed.

4. The method of claim 3 also comprising after step (c) and before step (e) sensing the force being applied by the ram to one of the first and second workpieces for approximating deflection of at least said one of the first and second workpieces and of the press by the force the ram applies to said one of the first and second workpieces.

5. The method of claim 4 wherein the drive comprises an electric motor drive and the force being applied by the ram to at least said one of the workpieces is determined by sensing the torque experienced by the motor during press-fitting of the first and second workpieces.

6. The method of claim 4 also comprising a lookup table in communication with the computer having a table of deflections of the workpiece and ram corresponding to a range of forces being applied by the ram to at least said one of the workpieces and at least during step (d) selecting the deflection for at least one of the first and second workpieces and the ram.

7. A method of press-fitting a first and a second tube into a differential housing having a pair of openings each for receiving one end of a tube therein so that each tube is accurately located relative to the differential housing comprising:

(a) providing a first tube, a second tube, a press having a base, a differential housing fixture carried by the base for receiving a differential housing, a first tube fixture for receiving one of the first and second tubes, a second tube fixture for receiving the other of the first and second tubes, a first ram carried by the base, a first drive in operable communication with the first ram for moving the first ram, a first ram position sensor to sense the axial position of the first ram while applying a force to the first tube to urge the first tube into one of the openings in the differential housing, a second ram carried by the base, a second drive in operable communication with the second ram for moving the second ram, a second ram position sensor to sense the axial position of the second ram while applying a force to urge the second tube into the other of the openings in the differential housing, and a computer in communication with the first and second drives and the first and second ram position sensors for controlling movement of the first and second rams;

(b) receiving a differential housing in the housing fixture;

(c) receiving one of the first and second tubes in the first tube fixture;

receiving the other of the first and second tubes in the second tube fixture;

(e) moving the first ram into engagement with the tube received in the first fixture to urge the tube into engagement with the differential housing;

(f) moving the second ram into engagement with the tube received in the second fixture to urge the tube into engagement with the differential housing;

(g) applying force to the first tube to urge the tube into one of the openings in the differential housing until it reaches an adjusted preset depth of insertion;

(h) applying force to the second tube to urge the tube into the other of the openings in the differential housing until it reaches an adjusted preset depth of insertion;

(i) approximating the deflection one of the tubes will undergo during the press-fitting of said one of the tubes into one of the openings in the differential housing;

(j) approximating the deflection the other of the tubes will undergo during the press-fitting of said other of the tubes into the other of the openings in the differential housing;

(k) determining a first offset for movement of the first ram proportional to the deflection of one of the tubes;

(l) determining a second offset for movement of the second ram proportional to the deflection of the other of the tubes;

(m) utilizing the first offset for movement of the first ram to control movement of one of the tubes to adjust its preset depth of insertion to compensate for deflection of the tube;

(n) utilizing the second offset for movement of the second ram to control movement of the other of the tubes to adjust its preset depth of insertion to compensate for deflection of the tube;

(o) the computer controlling the first drive and utilizing the first ram position sensor and the first offset to control the extent of movement of the first ram to press fit one of the tubes to its adjusted depth of insertion so at least a portion of the tube is accurately located relative to the housing; and (p) the computer controlling the second drive and utilizing the second ram position sensor and the second offset to control the movement of the second ram to press fit the other of the tubes to its adjusted depth of insertion so at least a portion of the other tube is accurately located relative to the housing.

8. The method of claim 7 wherein during step (i) the deflection of both the press and the one tube is approximated and during step (j) the deflection of both the press and the other tube is approximated, and during steps (k) and (l) the offsets determined are proportional to deflection of the press and each tube.

9. The method of claim 7 wherein the differential housing has a locator and each of the tubes has a flange between its ends and each tube is inserted into a differential housing opening to its adjusted depth of insertion such that the flange of each tube is accurately located relative to the differential housing locator.

10. The method of claim 7 wherein steps (e) and (f) are performed substantially simultaneously and steps (g) and (h)

are performed substantially simultaneously for inserting both tubes into their respective differential housing opening at substantially the same time.

11. The method of claim 7 also comprising during steps (g) and (h) sensing the force being applied to each tube to insert it into the differential housing and during steps (i) and (j) selecting from a lookup table a deflection for each tube corresponding to the force being applied to the tube sensed during steps (g) and (h) for determining the offset to apply to the preset depth of insertion of each tube during steps (m) and (n).

12. The method of claim 11 wherein the offset determined during step (k) is substantially equal to the deflection of one of the tubes and the offset determined during step (l) is substantially equal to the deflection of the other of the tubes.

13. The method of claim 11 wherein the deflection of each tube is determined during steps (i) and (j) and the offset is determined during steps (k) and (l) and applied to adjust the preset depths of insertion during steps (m) and (n) when each tube has been inserted into the differential housing to nearly its preset depth of insertion.

14. The method of claim 7 also comprising for one of the tubes after step (e) and for the other of the tubes after step (f), determining an offset to apply to each preset depth of tube insertion to compensate for at least one of deflection and shifting of at least one of the tube fixtures and the differential housing fixture and applying said offset to the preset depth of insertion of each tube to adjust its depth of insertion so that it compensates for at least one of deflection and shifting of at least one of the tube and housing fixtures, and inserting each tube into its differential housing opening to its adjusted depth of tube insertion so at least a portion of each tube is accurately located relative to the differential housing.

15. The method of claim 14 wherein determining the offset to apply to the depth of insertion of each tube also comprises, while simultaneously press fitting both tubes in generally opposed relationship, sensing the force being applied to one of the tubes during insertion of the one tube into its differential housing opening, sensing the force being applied to the other of the tubes during insertion of the other tube into its differential housing opening, subtracting the insertion force of the one tube from the insertion force of the other tube and determining the offset to apply to the preset depth of insertion to compensate for at least one of deflection and shifting of at least one of the fixtures by selecting from a lookup table an offset corresponding to the difference in insertion forces being applied to the tubes so that the preset depth of insertion of each tube will be adjusted to compensate for at least one of deflection and shifting of at least one of the fixtures for accurately inserting each tube into the differential housing to a depth such that a portion of each tube is accurately located relative to the housing.

16. The method of claim 7 wherein the differential housing has a locator and each of the tubes has a flange between its ends and for the one of the tubes before step (g) and for the other of the tubes before step (h) sensing the location of the flange of each tube relative to the tube, for each tube determining any deviation in location of the flange on the tube relative to a predetermined desired location of the flange on the tube and adjusting the preset depth of insertion of each tube in the amount of at least some of the deviation in location of the flange on the tube to offset the deviation in location of the flange on the tube so that each tube is inserted into a differential housing opening to its adjusted depth of insertion such that the flange of each tube is accurately located relative to the differential housing locator.

* * * * *

UNITED STATES PATENT AND TRADEMARK OFFICE
CERTIFICATE OF CORRECTION

PATENT NO. : 6,128,814
DATED : October 10, 2000
INVENTOR(S) : Zbigniew J. Belka and William M. Faitel It is certified that error appears in the above-indentified patent and that said Letters Patent is hereby corrected as shown below:

Col 22, Line 6, before "receiving" isnert -- (d) --.

Signed and Sealed this

Seventeenth Day of April, 2001

Attest:

NICHOLAS P. GODICI

*Attesting Officer*     *Acting Director of the United States Patent and Trademark Office*